United States Patent [19]

Novak

[11] Patent Number: 5,301,481

[45] Date of Patent: Apr. 12, 1994

[54] GARDEN STAKE

[76] Inventor: Sergei Novak, P.O. Box 1391, Vista, Calif. 92805-1391

[21] Appl. No.: 805,547

[22] Filed: Dec. 10, 1991

[51] Int. Cl.⁵ .............................................. E02D 5/80
[52] U.S. Cl. .................................... 52/165; 52/155; 47/47
[58] Field of Search ................ 52/165, 155, 156, 158, 52/159; 47/42, 43, 44, 46, 47

[56] References Cited

U.S. PATENT DOCUMENTS

| | | | |
|---|---|---|---|
| 202,179 | 4/1878 | Lennon | 52/155 |
| 1,119,943 | 12/1914 | Fontaine | 52/160 |
| 1,153,380 | 9/1915 | Fussell | 52/155 |
| 1,998,031 | 4/1935 | Thomas | 47/47 |
| 2,296,217 | 9/1942 | Maloney | 47/43 |
| 3,305,985 | 2/1967 | Dean | 52/155 |
| 4,091,882 | 5/1978 | Hashimoto | 52/160 |
| 4,547,106 | 10/1985 | Lipsker | 52/160 |
| 4,939,877 | 7/1990 | Claffey | 52/155 |

Primary Examiner—Carl D. Friedman
Assistant Examiner—Christopher T. Kent
Attorney, Agent, or Firm—Marcia Devon

[57] ABSTRACT

An inexpensive garden stake to provide physical and structural support to growing plant life is disclosed. The invention provides an improved device for providing an anchoring base to the supporting stake which increases the useful life of a garden stake. The anchor has legs which expand upon implantation. The increased support provided by the anchor reduces the need for re-planting or disturbing the plant in a significant manner.

19 Claims, 2 Drawing Sheets

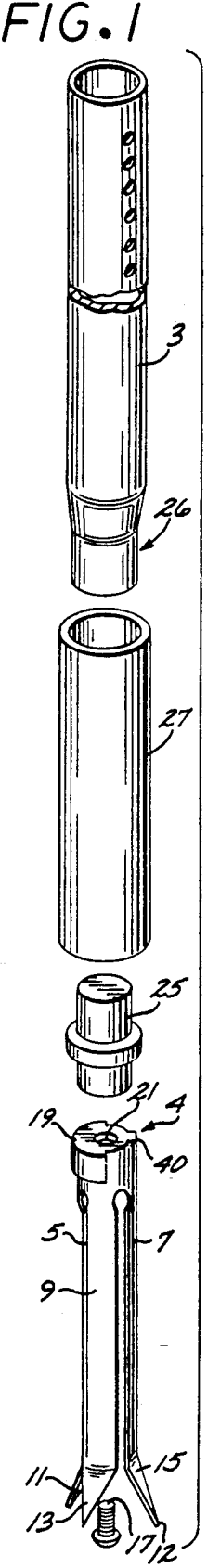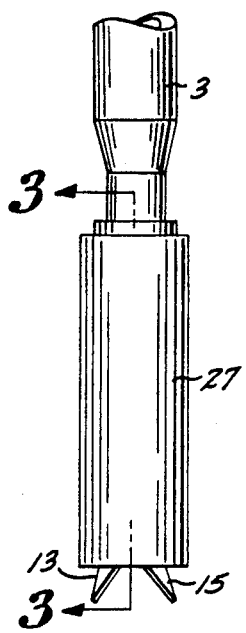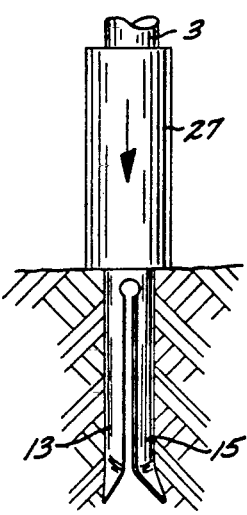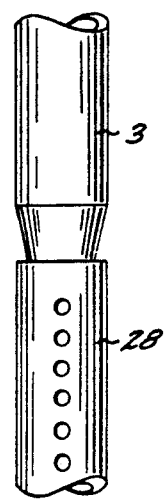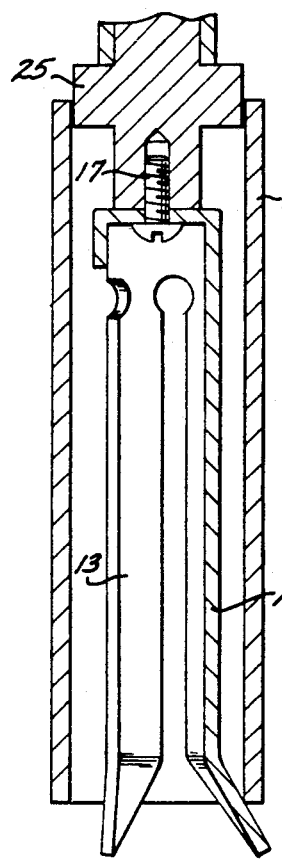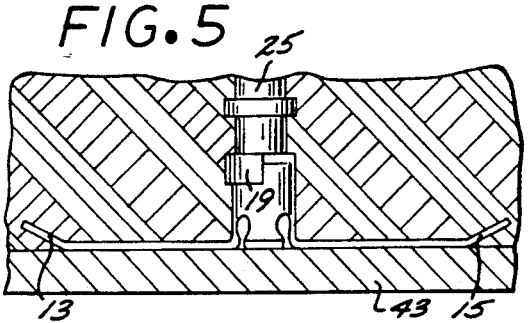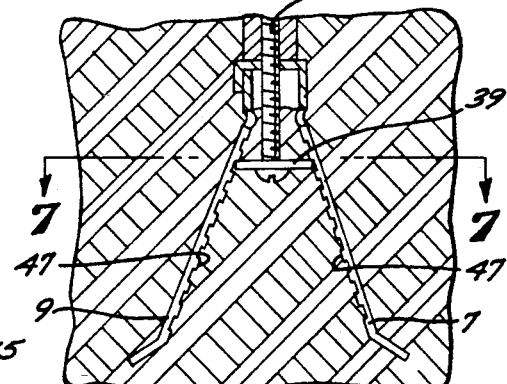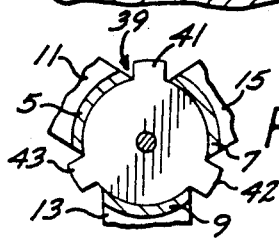

FIG. 9
FIG. 10
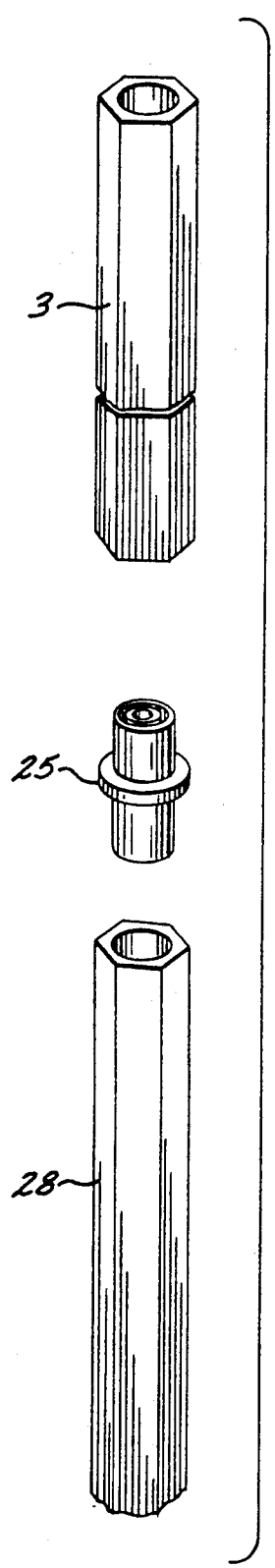
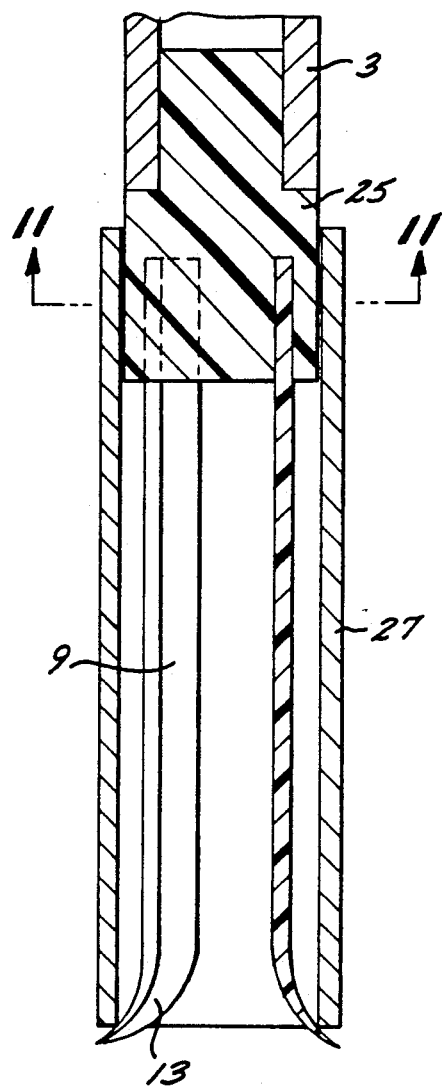
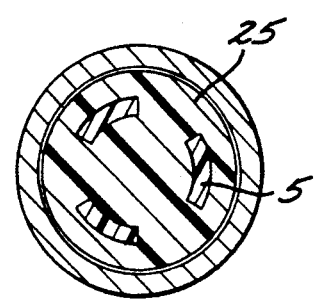
FIG. 11

GARDEN STAKE

BACKGROUND OF THE INVENTION

1. Field of the Invention

This invention relates to a novel and improved support for growing plants in the ground or in potted plants.

2. Prior Art

Horticulturists and gardeners have traditionally used a garden stake to provide support for many types of plants, particularly vines, which are planted in the ground and in containers. One disadvantage of conventional garden stakes is that they do not provide adequate support for the plant because the stake itself is not rigidly fixed in the ground or container so that the conventional garden stake often begins to lean over and is difficult to maintain in an upright position. The conventional garden stakes are particularly likely to lean over from the upright position as the plant grows larger. When the stake leans over from its upright, vertical position in a potted plant, the gardener may attempt to solve the problem by replanting and reinserting the stake.

With the present invention, the novel design of the garden stake provides substantially improved anchor fixing of the garden stake in the soil so that the stake will remain upright even as the plant grows. The garden stake of the present invention provides an improved support so that the garden stake will remain upright and vertical eliminating the need to replant and reinsert the stake. Eliminating the necessity to replant is particularly important when it is aesthetically or physically impractical to replant. If replanting is necessary, the present invention facilitates the removal of the plant by simply pulling out the garden stake. As the root ball is intertwined with the anchor, the plant will be removed with the stake.

SUMMARY OF THE INVENTION

The principal object of the invention has been to provide a versatile, rigid plant support which is simple in design, inexpensive to manufacture, easy to install and easy to use.

Another object of the invention is to provide a rigid attachment to the upright support, improving stability without major disturbance to the surrounding plant life or root system. The radially-expanding feet provide improved mechanical support for the stake or support so that garden stake will remain in an upright position.

Another objective of this invention is to provide a garden stake which may be of varying heights, is simple to use and which requires a minimum of tools to assemble and install.

Another objective of this invention is to provide a device which does not adversely effect or detract from the beauty of the plant being supported.

Another objective of this invention is to provide a device containing no outwardly projecting elements to cause injury or to catch clothing and the like.

By using either metals, plastics or wood products in its construction, the invention satisfies another objective of this invention by using materials which are inert and will not adversely effect plant growth on chemical reaction with the soil.

The garden stake of the present invention includes a support, which may be a cylindrical tube. The support is maintained in an upright vertical position by an anchor. The anchor has legs which expand radially when the anchor is inserted into the ground.

BRIEF DESCRIPTION OF THE DRAWINGS

FIG. 1 is an exploded perspective view of the present invention;

FIG. 2 is a partial axial view of the present invention;

FIG. 3 is a cross-sectional view of the retaining ring of the present invention taken along the line 3—3 shown in FIG. 2;

FIG. 4 is a partial cross-section view of one embodiment of the present invention showing its insertion into the ground;

FIG. 5 is a partial cross-sectional view of another embodiment of the present invention showing its configuration when used to support a potted plant;

FIG. 6 is a partial cross-sectional view of another embodiment of the present invention showing its use with plants growing in the ground;

FIG. 7 is a cross-sectional view of a portion taken along the line 7—7 of FIG. 6;

FIG. 8 is a partial axial view of the present invention;

FIG. 9 is a partial exploded view of the present invention;

FIG. 10 is a cross-sectional axial view of an embodiment of the present invention;

FIG. 11 is a partial cross-sectional view of an embodiment of the present invention taken along line 11—11 of FIG. 10.

DETAILED DESCRIPTION OF THE PREFERRED EMBODIMENT

Referring initially to FIG. 1 of the drawings, one preferred embodiment of the garden stake 1 of the present invention is shown. The garden stake includes the support 3 which is connected to the anchor 4. The anchor 4 has legs, 5, 7 and 9 which expand radially outward. The legs are formed with feet 11, 13 and 15. The garden stake 1 is inserted into the ground by exerting downward force on the support 3 which places a downward force on the anchor 4, urging the anchor into the soil. Upon insertion, the legs are flared outward into the soil, serving as an anchor securing the support 3 in an upright position in the soil.

In a preferred embodiment, the feet have pointed ends 12, as shown in FIG. 1, to aid in soil and root penetration. Rounded or blunt-ended feet may also be used.

The anchor 4 may be affixed to the support 3 in a number of different ways. A cylindrical plug 25 is inserted on one end in the bottom 26 of the support 3 and on the other end is connected to the anchor as seen in FIG. 3. In one embodiment shown in FIGS. 1 and 3, the fastener 17 is inserted into plug 25 through the cap 19 and the opening 21 located at the top of the anchor 4 and into the plug 25. The plug 25 may be tapered at both ends to facilitate the assembly of the support 3. Multiple sections of the support may be connected to each other to achieve the various heights of the stake. Referring to FIG. 8, another section 28 is connected to support 3 to increase the height.

The garden stake of the present invention has two separate configurations, one for use with potted plants and a second configuration for use with plants growing in the ground. It has been found that in many instances the bottom of the pot provides sufficient resistance to force the legs outward with the application of a downward force. When downward vertical force is placed on support 3 through the guide 27, the legs 11, 13 and 15 expand radially when they make contact with the bottom of the container 43 in which the plant is growing, as shown in FIG. 5.

When the garden stake of the present invention is inserted into the ground as shown in FIG. 4 for use with plants growing in ground soil, another method is used to cause the feet of anchor 4 to radially expand upon insertion into the ground. Referring to FIG. 6, an elongated fastener or screw 35 and an expansion ring 39 placed inside the legs are utilized to radially expand the feet. The expansion ring 39 forces the legs outward when the apparatus is inserted into the soil to the desired depth. The threads of the screw 35 are received by the of plug 25. As the user pushes down on the support 3 through the guide 27 applying downward vertical force on threaded plug 25, the screw 35 is tightened into the plug 25 thereby causing the ring 39 to move toward the support.

The guide 27 is used to assist in the penetration of the soil by the anchor and to frustrate premature expansion of the legs. The guide 27 is placed around the combination of the support 3 and the anchor 4 prior to insertion into the soil. The guide 27 is placed to constrain the motion of the feet as shown in FIG. 2. The guide 27 is held with one hand while the support 3 is rotated clockwise and pushed downward as shown in FIG. 4. The clockwise motion of support 3 tightens the elongated screw 35 in the plug 25, thereby causing the expansion ring 39 to move toward the support. The expansion ring has an outer diameter greater than that of the anchor such that when the support 3 is rotated, the legs 5, 7, and 9 expand outwardly in a plane substantially perpendicular to the axis of the support 3. Downward force and rotation on the anchor 4 and the elongated screw 35 causes the expansion ring 39 to move upward urging the legs to spread outward, as shown in FIG. 6. When the insertion of the anchor in the soil is completed, the guide 25 is withdrawn upward as the feet expand.

The guide 27 is also used to hold the anchor in place while the support 3 is being turned, tightening the elongated screw 35. The interior portion of the guide 27 is formed with a groove or a track (not shown). In the preferred embodiment, the anchor 4 is formed of a single piece of sheet metal which is rolled into the substantially cylindrical shape shown in FIG. 1. When the sheet metal is rolled, a seam 40 is formed with a small gap between the ends of the sheet metal. The seam 40 is engaged by the track, thereby retaining the anchor 4 while the support is being turned.

The expansion ring 39 is generally circular in shape and may be formed with One Or more tabs 41, 42, and 43 extending outward from its perimeter. The inner surface of the anchor 4 may be serrated as shown in FIG. 7. The tabs engage the grooves 47 to retain the expansion ring in place against the legs of the anchor and to facilitate the desired expansion of the legs. The outer diameter of the expansion plate is approximately equal to or slightly greater than the outer dimension of the anchor. Experimentation indicates these tabs are not necessary if care is exercised in the insertion of the anchor, but the tabs and the grooves do provide improved performance.

After the stake is installed in the soil, the plant may be tied to the support by means of a string, tie-wrap, cord, or other means. Perforations to aid in tying the plant to the stake may be provided in the support 3, as shown in FIG. 1 and as shown in FIG. 8, to hold string and the like.

The anchor 4 may advantageously be integrally formed with the plug 25 as shown in FIGS. 10 and 11, or alternatively, bonded or otherwise affixed to the end 26 of the support. When screw 17 is used to Connect the anchor to the support through the plug 25, the plug may have threaded to engage the threads of the screw 17 or the screw 17 may be self-tapping. When the plug 25 is integrally formed with anchor 4, the plug includes slots for receiving the legs of the anchor as shown in FIG. 11.

The support 3 may also use wire or other stiffening elements to permit the use of such materials which normally return to their initial configuration, such as nylon and plastics. The grooves 47 provide resistance between the legs and the expansion ring 39 which permits the use of flexible materials for the anchor, such as thin metal, plastic, nylon, wood, bamboo, or other materials. Experimentation with bamboo or other wood products, have demonstrated an ability to provide the geometrical and structural needs of this invention could be used. Such materials provide a biodegradable alternative to the plastics and metal embodiments. While the preferred embodiment employs metal stamping or molding, the garden stake of the present invention may also be machined from solid stock.

The support 3 may advantageously be hollow and made from extruded plastic. The support 3 may be a variety of different shapes, including a cylindrical tube as shown in FIG. 1 or hexagonal in cross-section as shown in FIG. 9.

I claim:

1. An apparatus for supporting a plant in soil comprising:
    a support;
    anchor means for holding said support in a vertical upright position, said anchor means having a center, said anchor means including a plurality of legs arranged radially around said center wherein only one end of each of said legs is integrally formed with said center, said legs having an inward position parallel to said support and an expanded position wherein said legs are splayed outwardly from said center;
    means for connecting said anchor means to said support; and
    guide means for maintaining said anchor in position, said guide means fitting over said legs, whereby said guide means hold said legs in said inward position until said support is in the desired position in the soil whereupon said guide means is removed permitting said legs to expand radially into said outward position in the soil thereby providing a base for said support substantially orthogonal to said support and maintaining said support in an upright position.

2. The apparatus of claim 1 wherein said support is comprised of a plurality of interlocking elements wherein one end of one element is received by one end of a second element.

3. The apparatus of claim 1 including means for controlling the expansion of said legs, wherein said means for controlling the expansion of said legs comprises:
    guide means for maintaining said anchor in position when said support is turned.

4. The apparatus of claim 3 wherein said means for controlling the expansion of said legs comprises:

expansion means for opening said legs radially outward.

5. The apparatus of claim 1 wherein said anchor means is formed from a single piece of sheet metal.

6. The apparatus of claim 1 wherein said legs include feet, said feet terminating in a point.

7. The apparatus of claim 1 wherein said means for connecting said anchor means to said support includes a substantially cylindrical plug.

8. The apparatus of claim 7 wherein said means for connecting said anchor means to said support includes a fastener.

9. The apparatus of claim 8 wherein said plug receives said fastener.

10. The apparatus of claim 5 wherein said sheet metal of said anchor forms a seam and further including a guide means for engaging said seam of said anchor.

11. The apparatus of claim 4 wherein said expansion means includes a expansion ring placed inside said legs and a means for pulling said expansion ring upward against legs thereby spreading said legs radially outward.

12. The apparatus of claim 11 wherein the means for pulling said expansion ring upwards by an elongated screw received by plug.

13. The apparatus of claim 11 wherein said expansion ring includes protrusions and said legs include serrations thereby said protrusions are received by said serrations.

14. The apparatus of claim 1 wherein said support holds perforations for receiving means for tying the plant to the apparatus.

15. The apparatus of claim 7 wherein said anchor is integrally formed with said plug.

16. The apparatus of claim 7 wherein said anchor is inserted into said plug.

17. The apparatus of claim 16 wherein said plug is formed with slots for receiving said legs.

18. The apparatus of claim 1 wherein each of said legs are separated by rounded serrations.

19. The apparatus of claim 3 wherein said means for controlling the expansion of said legs further comprises:
expansion means for opening said legs radially outward.

* * * * *